Figure 1:
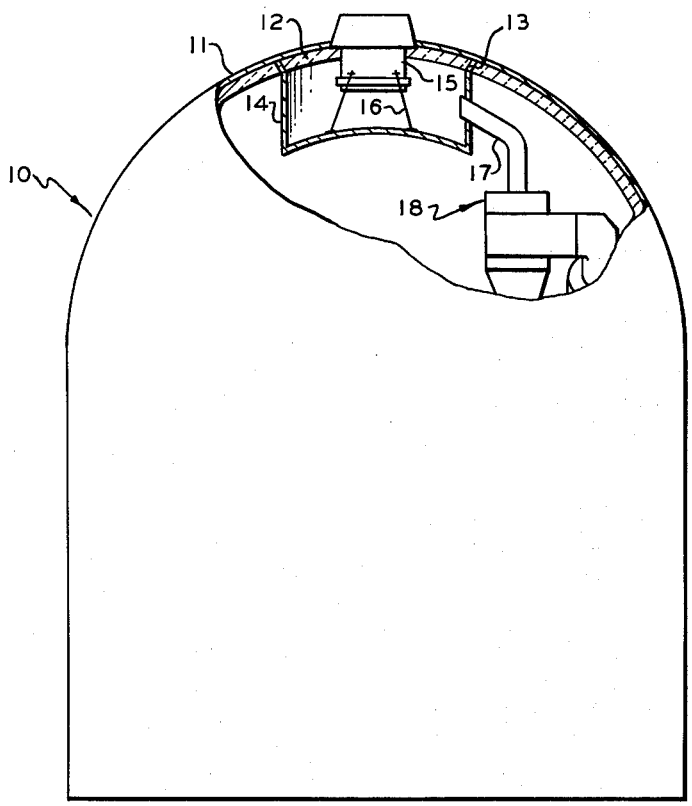

June 7, 1966    L. F. KUSEK ETAL    3,254,476
EXPANSION JOINT
Filed March 16, 1962

INVENTORS
L.F. KUSEK
J.R. JOHNSON
BY *Young & Quigg*
ATTORNEYS

United States Patent Office 3,254,476
Patented June 7, 1966

3,254,476
EXPANSION JOINT
Louis F. Kusek and John R. Johnson, Kansas City, Kans.,
assignors to Phillips Petroleum Company, a corporation of Delaware
Filed Mar. 16, 1962, Ser. No. 180,101
2 Claims. (Cl. 55—267)

This invention relates to an expansion joint for connecting metals. In one aspect, this invention relates to a deformable metal member rigidly connected to two metal elements subject to different expansion and contraction changes. In another aspect, this invention relates to a deformable frusto-conical shell member or transition element connecting a vessel to an appurtenance to provide unrestrained movement of said appurtenance with respect to said vessel due to expansion and contraction.

The problem of connecting metal members to each other to provide a rigid connection which will withstand stresses encountered due to expansion and contraction is an ever present one in industry. This problem can come about through the connection of dissimilar metals having different coefficients of thermal expansion. Also, the problem can present itself when metals are rigidly connected together that are subject to different temperatures, thereby resulting in different expansion and contraction changes. The expansion and contraction problem is particularly aggravated when one attempts to provide a rigid connection between dissimilar metals that are exposed to different temperatures. For example, in fluid catalytic cracking operations the dome of the regenerator is made of a steel having a coefficient of thermal expansion somewhat less than that of an internal plenum chamber connected thereto. Furthermore, the interior surface of the dome is shielded from the high heats encountered within the regenerator by a relatively thick layer of refractory. Thus, one is faced with the problem of compensating for the difference in expansion of the two metals due to differences in temperature as well as differences in the physical properties of the two metals.

The present invention relates to a novel and improved deformable joint particularly adapted for connecting a vessel wall with an appurtenance with a rigid connection to provide for the unrestrained movement of the appurtenance with respect to the vessel wall due to expansion and contraction.

Accordingly, an object of this invention is to provide a novel transition element or expansion joint for metal connections.

Another object of this invention is to provide an improved expansion joint connecting the wall of a vessel with an internal chamber or appurtenance to absorb stresses and provide unrestrained movement between the vessel wall and chamber due to expansion and contraction.

Other objects, aspects, as well as the several advantages of the invention will be apparent to those skilled in the art upon a further consideration of the specification, drawings and the appended claims.

According to the invention, an expansion joint or transition element comprising a relatively short or narrow deformable frusto-conical shell element is provided for connecting metal elements having different expansion and contraction changes. The frusto-conical shell element of the invention is particularly suitable for connecting a wall of a vessel with an appurtenance to provide unrestrained movement of the appurtenance with respect to the vessel wall due to expansion and contraction. The transition element of the invention compensates for the differences in expansion of metals due to differences in temperature as well as physical properties of the metals. The frusto-conical shell element of the invention can be made of the same metal as one or more of the metals to which it is joined or it can be a different metal.

The expansion joint or transition element of the invention is particularly adapted for providing a rigid connection between a sloping wall of a vessel with an internal chamber wherein the vessel and chamber have different changes of expansion and contraction. According to the invention, the frusto-conical shell element forms a deformable joint between the two elements being joined to provide flexibility and thereby absorb the differential expansion. In the above embodiment, ordinarily the larger diameter end of the frusto-conical shell expansion joint of the invention is connected to the metal having the least growth under operating conditions.

A better understanding of the invention will be obtained on reference to the accompanying drawing wherein the frusto-conical shell element of the invention is employed in a preferred structure connecting an internal plenum chamber with the dome of a FCC regenerator.

Figure 2:
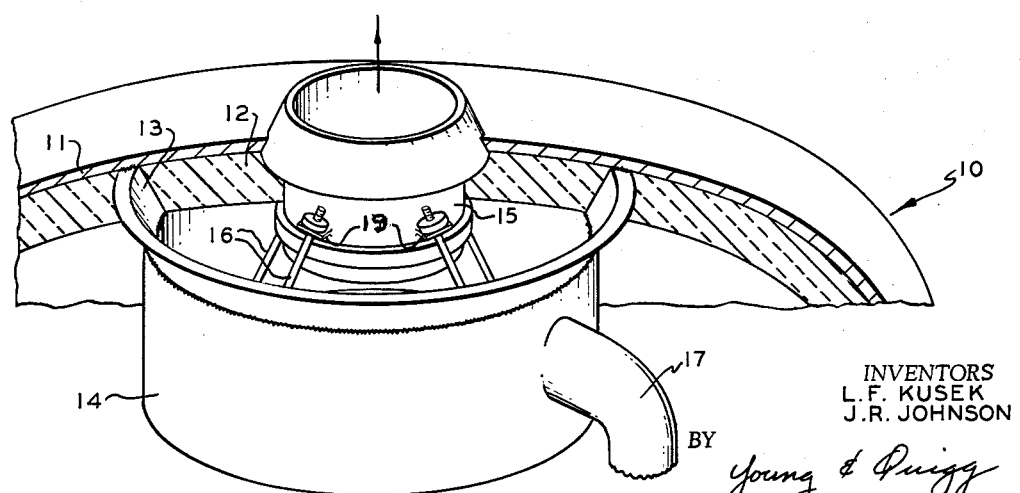

FIGURE 1 diagrammatically illustrates a FCC regenerator, partially cut away, showing a cyclone separator, a plenum chamber, and the invention frusto-conical shell element connecting the plenum chamber to the regenerator dome. FIGURE 2 is an enlarged view of the plenum chamber, the frusto-conical shell element of the invention, and the regenerator dome.

Referring now particularly to FIGURE 1, a FCC regenerator designated numeral 11 contains a cyclone separator 18, a plenum chamber 14, and a vapor outlet 15. Catalyst containing deposited carbon is regenerated by burning within the regenerator 10. The hot gases containing entrained catalyst solids enters cyclone 18 wherein the solids are separated out and returned to the lower portion of the regenerator. Hot gases are removed from the cyclone by way of line 17 and introduced into plenum chamber 14 wherein the gases from one or more cyclones are collected and then passed to a stack, not shown, for example, by way of outlet 15. Although the drawing illustrates only one cyclone, it should be understood by those skilled in the art that a plurality of cyclones can be located within regenerator 10 and the gases from each passed to plenum chamber 14.

Referring now more specifically to FIGURE 2, the roof or dome wall of regenerator 10 is designated numeral 11. A relatively thick layer of refractory 12 covers the inside of the dome 11 of regenerator 10. The plenum chamber is held in position by rods 16 connected to outlet 15 by means of connections 19. Plenum chamber 14 is illustrated as being cylindrical, however, it can be square, rectangular, or other shape so long as it is provided with a suitable opening for connection with frusto-conical shell element 13.

According to the invention, dome 11 is rigidly connected to plenum chamber 14 by means of frusto-conical shell element 13 welded to both the regenerator wall and the plenum chamber. As shown in the drawing, the base of the frusto-conical shell element is welded to the inside surface of dome 11 and the top of the frusto-conical shell element is welded to plenum chamber 14. The frusto-conical shell element forms a knuckle or expansion joint providing flexibility to absorb the differential expansion encountered between the dome and plenum chamber since the inside of regenerator 10 is exposed to temperatures ranging from about 1000 to 1100° F. whereas the temperature external to the regenerator is in the neighborhood of about 350° F. The slant height of the frusto-conical shell element 13 can vary somewhat depending on the particular installation, but we have found that a unit less than about 12 inches gives very satisfactory results. The normal range of ratios of element 13 diameter to slant height is 1:40 to 1:15. The slope or angle of slant from the vertical for frusto-conical shell element 13 can range from about 15 to 45°, or more, when desired. In FCC regenerators, the plenum chamber is ordinarily fabricated from stainless steel, which has a coefficient of thermal expansion substantially greater than that of carbon steel, which is a suitable metal for use in the regenerator walls. Frusto-conical shell element 13 can be fabricated from stainless steels, carbon steels or other suitable materials that can be welded to the units to be rigidly joined.

In a specific example, we have employed a frusto-conical shell expansion element similar to that described above without failure of the joint due to expansion and contraction. The frusto-conical shell element was employed in an operating FCC regenerator provided with a plenum chamber which was connected by means of welded connections to the dome of the regenerator by an inverted frusto-conical shell according to the invention. The conditions employed within the regenerator, the types of steel employed in the various units and other pertinent information are set forth below in Table I.

TABLE I (1) Plenum chamber 14:
  Temperature, °F. _____ 1100.
  Thermal coef. of exp., in./in./°F. . $10.7 \times 10^{-6}$.
  Type steel, A.I.S.I. _____ 304.

(2) Inverted conical shell 13:
  Temperature, °F. _____ 1100.
  Thermal coef. of exp., in./in./°F. . $7.97 \times 10^{-6}$.
  Type steel, ASTM _____ A301, Grade A.
  Inside small diam. _____ 17'0".
  Inside large diam. _____ 17'7½".
  Thickness _____ ½".
  Slant height _____ 7½".
  Angle of slant from vertical ____ 30°.

(3) Regenerator shell 11:
  Temperature, °F. _____ 300.
  Thermal coef. of exp., in./in./°F. . $7.97 \times 10^{-6}$.
  Type steel, ASTM _____ A285, Grade C.
  Insulation 12 _____ 7½".

While the detailed description of the invention pertains to a transition element or expansion means comprised of a frusto-conical shell element adapted for connecting a plenum chamber to a sloping wall of a FCC regenerator or reactor, the invention is not limited to this particular application but, on the contrary, is applicable to the connection of other types of elements, particularly where the elements have different expansion and contraction changes, and especially where appurtenances are to be connected to sloping walls of vessels.

Certain modifications of the invention will become apparent to those skilled in the art and the illustrative details disclosed are not to be construed as imposing unnecessary limitations on the invention.

We claim:
1. An apparatus for effecting contacting operations between hot gases and fluidized solids and separation of solids from the gases suspending and entraining same, which comprises, in combination, a substantially closed cylindrical contacting vessel having a sloping roof, a vapor outlet means positioned substantially coaxial with said vessel and in said roof, a plenum chamber positioned within said vessel and substantially coaxial with said vessel; said plenum chamber having upstanding side wall means and a bottom wall means and supported by connecting rod means connected to and depending from said vapor outlet means and attached to said plenum chamber bottom wall means, said chamber wall means and said roof having different coefficients to thermal expansion, at least one cyclone separator disposed within said vessel and having a cleaned gas outlet and conduit means operatively connecting said cleaned gas outlet to said plenum chamber so that gases can pass directly from said cyclone to said plenum chamber and out said vapor outlet means, and a deformable inverted frusto-conical metal shell member positioned within said vessel and rigidly and sealingly connected at all points of the periphery of the larger diameter end to said roof and at all points of the periphery of the smaller diameter end to the top of said plenum chamber upstanding wall means, the frusto-conical member and said plenum chamber bottom wall means closing off an upper portion of the region under said roof and said outlet means, and said roof and said frusto-conical member having substantially the same coefficients of thermal expansion.

2. The apparatus of claim 1 to include a layer of refractory material positioned under said roof and adjacent said roof and said member.

References Cited by the Examiner

UNITED STATES PATENTS

| | | | |
|---|---|---|---|
| 986,164 | 3/1911 | Glennan | 285—173 |
| 1,780,478 | 11/1930 | Grace | 165—83 X |
| 1,781,108 | 11/1930 | Grace | 165—83 |
| 2,164,628 | 7/1939 | Sibley | 165—83 X |
| 2,336,017 | 12/1943 | Jewell et al. | |
| 2,515,155 | 7/1950 | Munday. | |
| 2,611,238 | 9/1952 | Fryer. | |
| 2,649,315 | 8/1953 | Ipsen. | |
| 2,735,803 | 2/1956 | Leffer. | |
| 2,769,227 | 11/1956 | Sykes et al. | 189—36 X |
| 2,836,902 | 6/1958 | North | 23—288.3 |
| 2,934,494 | 4/1960 | Kleiber | 55—345 X |
| 3,053,643 | 9/1962 | Osborne. | |
| 3,053,753 | 9/1962 | Slyngstad et al. | |

OTHER REFERENCES

Sitting, Marshall: "Fluidized Solids," Chemical Engineering (A), vol. 60, No. 5, May 1953, pp. 219–331 (only FIGURE 3, page 222 and FIGURE 10, page 229 are relied upon).

Lates Fluid Cat Cracker, Chemical Engineering (B), volume 60, June 1953, p. 114.

HARRY B. THORNTON, *Primary Examiner.*

D. TALBERT, L. H. McCARTER, *Assistant Examiners.*